June 5, 1956 J. W. CARTER 2,749,111
VACUUM SEAL FOR FAN SHAFT OF HEAT TREATING FURNACE
Filed Aug. 24, 1951
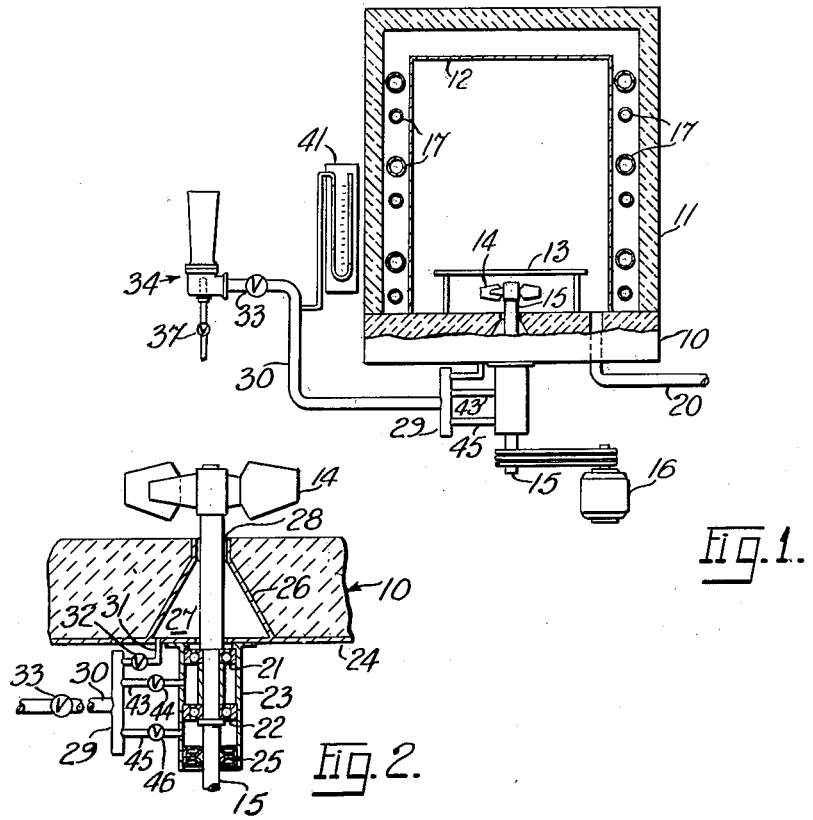
Fig. 1.
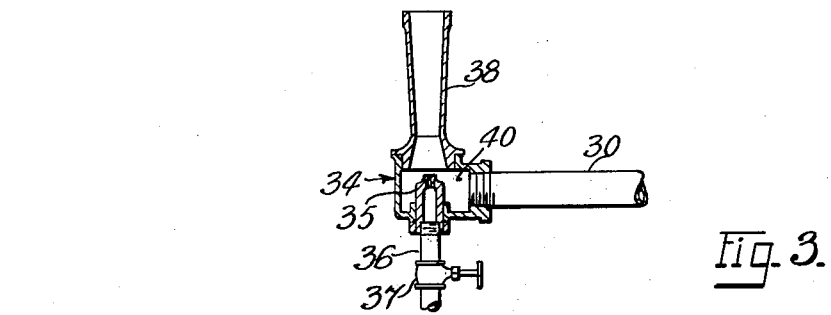
Fig. 2.
Fig. 3.
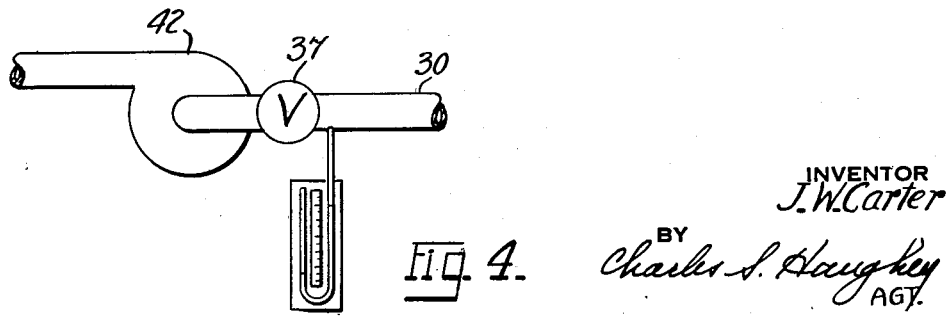
Fig. 4.
INVENTOR
J. W. Carter
BY
Charles S. Haughey
AGT.

United States Patent Office 2,749,111
Patented June 5, 1956

2,749,111

VACUUM SEAL FOR FAN SHAFT OF HEAT TREATING FURNACE

John W. Carter, Toledo, Ohio, assignor to Surface Combustion Corporation, Toledo, Ohio, a corporation of Ohio Application August 24, 1951, Serial No. 243,382

6 Claims. (Cl. 266—5)

This invention relates to atmosphere furnaces wherein it is desired to maintain an atmosphere free from contamination by atmospheric air, and more particularly to means for preventing infiltration of air into a furnace along a turning shaft which extends thereinto.

Where the furnace atmosphere is provided by products of combustion from the burners which heat the furnace, or from a separate gas generator, and where a high speed fan is driven by a shaft extending through the furnace walls the problem of preventing air infiltration becomes most difficult, and it is in connection with such a furnace, as is commonly used for annealing ferrous or non-ferrous metals that the invention is here described.

For a consideration of what I believe to be novel and my invention, attention is directed to the following specification and the concluding claims thereof.

In the drawing:

Fig. 1 is a more or less diagrammatic representation of a furnace to which the invention is applied.

Fig. 2 is a vertical sectional view of a portion of the furnace of Fig. 1.

Fig. 3 is a detail view of the exhaust means shown in Fig. 1.

Fig. 4 shows alternate exhaust means to that shown in Fig. 3.

The furnace illustrated comprises a base 10, a removable heating hood 11, an inner cover 12 and a stool 13 on which work, such as coils of sheet metal, is supported. A centrifugal type fan 14 is supported on a shaft 15 which extends through the furnace base and is exteriorly driven by motor 16. Heat may be supplied to the furnace by radiant tubes 17, or by direct fired burners carried by the heating hood 11.

A gas atmosphere is supplied to the furnace by pipe 20, being supplied by a conventional combustion type gas generator not shown. It will be understood that in a direct fired furnace with no inner cover, such as a continuous rod or tube heating furnace having open doors at each end, an external heater box with ducts for removing atmosphere from the furnace for heating or cooling it and returning it to the furnace chamber, and a circulating fan in said ducts for circulating atmosphere through said box for heating or cooling, the atmosphere may be products of combustion from the burners which supply heat to the furnace. Fans may be supplied within the furnace chamber to circulate the gases within the furnace to accelerate the heating or cooling of work therein, and in continuous furnaces rollers on shafts may be supplied to carry the work through the furnace.

While the invention is herein illustrated in a simple form, on a fan for a batch type furnace, it will be appreciated that it is equally applicable to all turning shafts for any and all purposes when said shafts pass through external walls of an atmosphere type furnace which is sensitive to infiltration of atmospheric air.

Referring now more particularly to Fig. 2 the fan 14 is supported on a shaft 15 which extends through the furnace base 10 and is supported thereon by bearings 21 and 22 in a casing 23 secured to the shell 24 of the furnace base. A seal 25 serves to reduce the inflow of atmospheric air into the casing 23. A metal cone 26 within the base 10 forms with the shaft 15 an orifice 28 entry to a plenum chamber 27 within the base. While the fan is operating and delivering gases under pressure from its impeller tips, a negative pressure is induced at the intake to the fan, along the shaft 15. This negative pressure may be four inches of water column in an ordinary case, and tends to cause an inflow of air through the seal 25, the bearings 21 and 22 and the orifice 28. To prevent flow of air through the orifice 28 into the chamber formed by the inner cover 12, a negative pressure, or suction, is applied to the chamber 27 through pipes 30 and 31 and valves 32 and 33, the suction being supplied by an eductor 34. The eductor comprises an air nozzle 35 which discharges air supplied thereto through pipe 36 and valve 37. The air from the nozzle 35 discharges into a venturi 38 and inspirates thereinto gases in the chamber 40 formed about the nozzle 35, said gases being supplied to the chamber 40 by the pipe 30. When the suction applied to the chamber 27 by the eductor is 8 inches water column and that induced by the fan 14 at the shaft 15 is 4 inches water column, there will be a positive flow of gases from the furnace chamber through the orifice 28 and no air will infiltrate therethrough to the furnace chamber. The suction induced by the fan alone may be measured on a U type water gauge 41 when the valve 33 is closed and valve 32 is open. When valve 32 is closed and valve 33 is open the suction induced by the eductor alone may be measured. The eductor induced suction should of course be greater than the fan induced suction.

An alternate method of inducing the flow of gases from the chamber 27 is shown in Fig. 4 wherein an exhaust fan 42 is adapted to exhaust gases from the pipe 30 in the place of the eductor 34.

It is sometimes more desirable and in some respects more effective to apply the suction of the exhaust means to other parts of the shaft casing 23 as between two sealed bearings 21 and 22, by way of manifold 29, pipe 43 and valve 44, or between the bearings and an external seal 25 as by pipe 45 and valve 46. It will be understood that only one of the valves 32, 44 and 46 will ordinarily be open at one time, and in the ordinary case only one of the three pipes 31, 43 and 45 will be supplied.

The vacuum loaded shaft bearing system herein illustrated is particularly useful where there is no source of atmosphere gas under pressure which might otherwise be applied through the pipe 30, and this system has added advantages in providing a cooling flow of air through the bearings on said shaft if so desired. To this end the seal 25 would ordinarily be omitted to provide greater flow of cooling air along the shaft, through the bearings and into either of pipes 31 and 43 as desired.

The eductor type of exhauster for the shaft bearing system is preferred where low volumes of gas will be handled but high vacuum may be needed. The eductor will not handle large volumes of gases efficiently, but will induce relatively high vacuum on relatively low motive air flows.

Especially in the case of roof fans where work being processed would be affected by grease falling from fan bearings, or on roller shafts where grease might contaminate the atmosphere if sucked into the furnace, it is preferred to use pipe 43 which will aspirate excess grease from between the bearings, although suction loading by any of the loading taps shown, pipes 31, 43 and 45, will substantially eliminate contamination of the furnace atmosphere by volatile grease components.

What I claim is:

1. An atmosphere type heat treating furnace comprising a base, a work support on said base, a heating hood over said support for heating work thereon, means for supplying a heat treating atmosphere to the chamber formed about said work support, a shaft extending through said base for turning a fan in said furnace, wall means forming a plenum chamber about said shaft and having aligned apertures therethrough through which the shaft extends from outside the furnace, through the plenum chamber, and into the furnace chamber, and means for exhausting gases from said plenum chamber to without the furnace.

2. In a heat treating furnace, in combination, wall means forming a chamber for heat treating work, a shaft extending through said wall means, a casing about said shaft having substantially closed ends along said shaft and forming a plenum chamber about said shaft, and exhaust means for exhausting gases from said plenum chamber to without said plenum chamber and said wall means whereby to induce flow of furnace gases into said plenum chamber from within said wall means along said shaft.

3. In a furnace according to claim 2 the combination which comprises bearing means at either end of the plenum chamber about said shaft.

4. In a heat treating furnace of the atmosphere type wherein a shaft extends through a wall of said furnace for applying a turning motion therethrough, and said shaft is supported by bearing means supported on said wall, the improvement which comprises a casing disposed about said shaft and bearing means and extending to said wall, means forming an orifice at either end of said casing and adjacent said shaft, and exhaust means adapted to exhaust gases from said casing between said orifices to without the furnace, whereby to cause furnace atmosphere gases to flow into said casing and thus prevent inflow of atmospheric air into said furnace along said shaft.

5. A furnace comprising a base, a removable heating hood over said base, and an inner cover within the heating hood and forming with the base a heating chamber, said base comprising means forming a plenum chamber having vertically aligned apertures, means for circulating atmosphere within the heating chamber and comprising a fan in the heating chamber, supported on a shaft extending through said plenum chamber and apertures, and means comprising an exhaust duct for maintaining in the plenum chamber a pressure less than atmospheric, whereby to exhaust from the plenum chamber through said duct such atmospheric air as may infiltrate into said plenum chamber along said shaft.

6. The method of preventing infiltration of gases into an enclosed chamber along a shaft passing through a wall of the enclosed chamber, which wall comprises wall means forming about the shaft a gas chamber having relatively restricted openings about the shaft at each end of said gas chamber; which method comprises exhausting gases from within said gas chamber to without said enclosed chamber whereby to provide in the gas chamber a pressure less than atmospheric and less than on the enclosed chamber side of said wall thus inducing flow of gas into said gas chamber through each of said openings.

References Cited in the file of this patent
UNITED STATES PATENTS

| | | |
|---|---|---|
| 1,617,359 | Westberg | Feb. 15, 1927 |
| 1,867,737 | Fletcher | July 19, 1932 |
| 2,152,154 | Robiette | Mar. 28, 1939 |
| 2,283,982 | Germany | May 26, 1942 |
| 2,479,102 | Dailey | Aug. 16, 1949 |
| 2,558,088 | Hoop | June 26, 1951 |